US011183144B2

(12) United States Patent
Nakamura (10) Patent No.: US 11,183,144 B2
(45) Date of Patent: Nov. 23, 2021

(54) METHOD FOR CONTROLLING DISPLAY DEVICE, AND DISPLAY DEVICE

(71) Applicant: SEIKO EPSON CORPORATION, Tokyo (JP)

(72) Inventor: Yasuhiro Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 63 days.

(21) Appl. No.: 16/706,917

(22) Filed: Dec. 9, 2019

(65) Prior Publication Data

US 2020/0184923 A1 Jun. 11, 2020

(30) Foreign Application Priority Data

Dec. 10, 2018 (JP) .............................. JP2018-231075

(51) Int. Cl.
| G06F 3/038 | (2013.01) |
| G09G 5/00 | (2006.01) |
| G06F 3/14 | (2006.01) |
| G06F 3/041 | (2006.01) |
| G06F 1/3231 | (2019.01) |
| G09G 3/00 | (2006.01) |

(52) U.S. Cl.
CPC ........... *G09G 5/006* (2013.01); *G06F 1/3231* (2013.01); *G06F 3/0416* (2013.01); *G06F 3/14* (2013.01); *G09G 3/006* (2013.01); *G09G 2330/022* (2013.01)

(58) Field of Classification Search
USPC ................. 345/667, 204, 205, 619, 163, 76; 348/705; 349/1
See application file for complete search history.

(56) References Cited

U.S. PATENT DOCUMENTS

| 2007/0201076 | A1 | 8/2007 | Ishida | |
| 2010/0060809 | A1* | 3/2010 | Okuda | G09G 3/003 |
| | | | | 349/1 |
| 2010/0277401 | A1* | 11/2010 | Takahara | H01L 27/3244 |
| | | | | 345/76 |
| 2011/0115983 | A1* | 5/2011 | Nishihata | H04N 9/641 |
| | | | | 348/705 |
| 2013/0050084 | A1* | 2/2013 | Soffer | G06F 21/32 |
| | | | | 345/163 |
| 2013/0207998 | A1* | 8/2013 | Aoki | G09G 5/00 |
| | | | | 345/619 |

(Continued)

FOREIGN PATENT DOCUMENTS

| JP | 2002-082734 A | 3/2002 |
| JP | 2005-301454 A | 10/2005 |

(Continued)

*Primary Examiner* — Thuy N Pardo
(74) *Attorney, Agent, or Firm* — Oliff PLC (57) ABSTRACT

A method for controlling a display device is for a display device having, as an operation mode, a first mode and a second mode different from the first mode. The method includes: detecting, in the first mode, a trigger for an event executed in the second mode; switching the operation mode from the first mode to the second mode, based on a switching operation to switch the operation mode from the first mode to the second mode; and executing the event after the operation mode is switched from the first mode to the second mode.

20 Claims, 2 Drawing Sheets

(56) References Cited

U.S. PATENT DOCUMENTS

| | | | |
|---|---|---|---|
| 2015/0002551 A1* | 1/2015 | Nagano | H04N 9/3188 |
| | | | 345/667 |
| 2016/0259486 A1* | 9/2016 | Fujimori | G06F 3/0416 |
| 2017/0285874 A1* | 10/2017 | Mueller | G06F 3/0416 |
| 2018/0155902 A1* | 6/2018 | Fujita | E02F 9/26 |
| 2018/0172990 A1* | 6/2018 | Fujita | G09G 5/14 |
| 2019/0004599 A1* | 1/2019 | Ikeda | G09G 5/36 |
| 2019/0057643 A1* | 2/2019 | Bae | G09G 3/3233 |
| 2020/0301577 A1* | 9/2020 | Bar-on | G06F 3/0416 |

FOREIGN PATENT DOCUMENTS

| | | |
|---|---|---|
| JP | 2007-189330 A | 7/2007 |
| JP | 2008-083615 A | 4/2008 |

* cited by examiner

METHOD FOR CONTROLLING DISPLAY DEVICE, AND DISPLAY DEVICE

The present application is based on, and claims priority from JP Application Serial Number 2018-231075, filed Dec. 10, 2018, the disclosure of which is hereby incorporated by reference herein in its entirety.

BACKGROUND

1. Technical Field

The present disclosure relates to a method for controlling a display device, and a display device.

2. Related Art

JP-A-2007-189330 describes an electronic apparatus having a normal mode and a demonstration mode for displaying a predetermined image. When a print start operation in the demonstration mode is made in this electronic apparatus, the electronic apparatus changes from displaying the predetermined image to displaying an image for print operation while maintaining the demonstration mode. As the print ends, the electronic apparatus returns from displaying the image for print operation to displaying the predetermined image.

As an example of the predetermined image displayed by the electronic apparatus, an image used for a screen saver, for example, a blackout image that turns the entire screen into black, or an animation image may be employed.

JP-A-2002-82734 describes an information processing device that can lock such a screen saver. When this information processing device detects an input for unlocking in a locked state where the screen saver is locked, the information processing device unlocks the locked state. Meanwhile, when an input different from the input for unlocking, for example, a trigger for an event executed in the unlocked state such as an operation of an input device to open a file, is made in the locked state, the information processing device ignores the trigger for the event.

The electronic apparatus described in JP-A-2007-189330 interrupts the display of the predetermined image in the demonstration mode even when maintaining the demonstration mode.

In contrast, the information processing device described in JP-A-2002-82734 maintains the display of the screen saver when the screen saver is locked.

However, the information processing device described in JP-A-2002-82734 ignores a trigger for an event generated in a particular mode such in the locked state and therefore has a problem in that the event is not executed even when the particular mode is canceled.

SUMMARY

A method for controlling a display device according to an aspect of the present disclosure is a method for controlling a display device having, as an operation mode, a first mode and a second mode different from the first mode. The method includes: detecting, in the first mode, a trigger for an event executed in the second mode; switching the operation mode from the first mode to the second mode, based on a switching operation to switch the operation mode from the first mode to the second mode; and executing the event after the operation mode is switched from the first mode to the second mode.

A display device according to another aspect of the present disclosure includes: a management unit managing, as an operation mode, a first mode and a second mode different from the first mode; a first detection unit detecting a switching operation to switch the operation mode from the first mode to the second mode; a second detection unit detecting a trigger for an event executed in the second mode; an execution unit executing the event; and a control unit controlling the management unit and the execution unit. The control unit causes the management unit to switch the operation mode from the first mode to the second mode, based on the detection of the switching operation by the first detection unit in the first mode, and causes the execution unit to execute the event after the operation mode is switched from the first mode to the second mode in response to the switching operation, based on the detection of the trigger by the second detection unit in the first mode.

DESCRIPTION OF EXEMPLARY EMBODIMENTS

A: First Embodiment

A1: Outline of Projector 1

Figure 1:
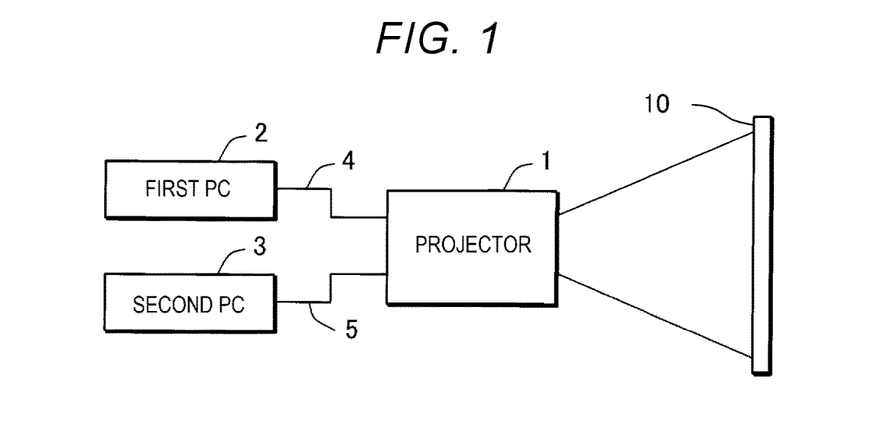
FIG. 1 shows a projector according to a first embodiment.

FIG. 1 shows a projector 1 according to a first embodiment. The projector 1 projects an image onto a projection surface 10 and thus displays the image. The projection surface 10 is an example of a display surface. The projection surface 10 is, for example, a screen, wall, ceiling, or three-dimensional object. The projector 1 is an example of a display device.

The projector 1 is electrically coupled to a first PC (personal computer) 2 via a first wiring cable 4. The projector 1 receives image information from the first PC 2. The image information received from the first PC 2 is hereinafter referred to as "first input image information". The first input image information is designated, for example, by a user.

The projector 1 is electrically coupled to a second PC 3 via a second wiring cable 5. The projector 1 receives image information from the second PC 3. The image information received from the second PC 3 is hereinafter referred to as "second input image information". The second input image information is designated, for example, by the user.

Each of the first PC 2 and the second PC 3 is an example of an image supply device. Generally, the image supply device can also be referred as a source device. The image supply device is not limited to the PC. For example, a DVD (digital versatile disc) player may be used as the image supply device. The number of image supply devices is not limited to two and may be any number equal to or greater than one. When a plurality of image supply devices exist, these image supply devices may be devices of the same type or may be devices of different types from each other.

Each of the first wiring cable 4 and the second wiring cable 5 is an HDMI (High-Definition Multimedia Interface) cable. HDMI is a registered trademark. Each of the first wiring cable 4 and the second wiring cable 5 is not limited to the HDMI cable and may be, for example, a USB (Universal Serial Bus) cable or VGA (Video Graphics Array) cable. USB is a registered trademark. The first wiring cable 4 and the second wiring cable 5 may be wiring cables of the same type or may be wiring cables of different types from each other.

The projector 1 has, as its operation modes, a first mode and a second mode different from the first mode.

In the first mode, the projector 1 projects a first mode image based on first mode image information onto the projection surface 10. However, the first mode is not limited to the mode in which the first mode image is displayed on the projection surface 10. For example, the first mode may be a mode in which the display of an image on the projection surface 10 is stopped.

The first mode image is an example of an image designated in advance. The first mode image is an image for screen saver that is an entirely black blackout image. However, the first mode image is not limited to the image for screen saver and may be, for example, an image showing an advertisement. When the projection surface 10 is a three-dimensional object, for example, a three-dimensional commodity, the first mode image may be an image decorating the three-dimensional object.

The first mode image information is stored in the projector 1. The first mode image information may be stored in a recording medium, for example, a USB memory, electrically coupled to the projector 1.

In the second mode, the projector 1 projects an image based on the first input image information received from the first PC 2 or an image based on the second input image information received from the second PC 3, onto the projection surface 10.

A2: Example of Projector 1

Figure 2:
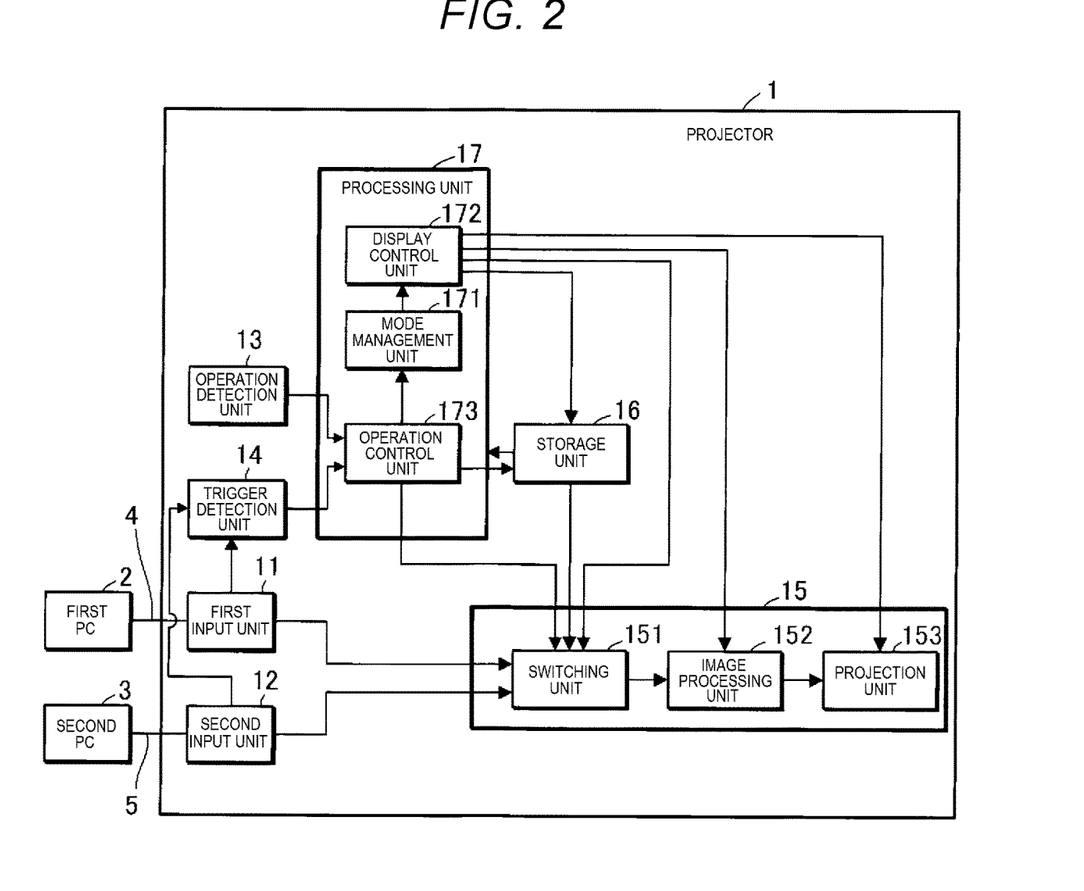
FIG. 2 shows an example of the projector.

FIG. 2 shows an example of the projector 1. The projector 1 includes a first input unit 11, a second input unit 12, an operation detection unit 13, a trigger detection unit 14, a display unit 15, a storage unit 16, and a processing unit 17.

The first input unit 11 is electrically coupled to the first wiring cable 4. The first input unit 11 receives the first input image information from the first PC 2 via the first wiring cable 4. The first input unit 11 detects whether the first input image information is inputted or not. On detecting an input of the first input image information, the first input unit 11 outputs first input information representing the input of the first input image information to the trigger detection unit 14. The first input unit 11 may regard and detect the electric coupling to the first wiring cable 4, as the input of the first input image information.

The second input unit 12 is electrically coupled to the second wiring cable 5. The second input unit 12 receives the second input image information from the second PC 3 via the second wiring cable 5. The second input unit 12 detects whether the second input image information is inputted or not. On detecting an input of the second input image information, the second input unit 12 outputs second input information representing the input of the second input image information to the trigger detection unit 14. The second input unit 12 may regard and detect the electric coupling to the second wiring cable 5, as the input of the second input image information.

The first input unit 11 is an example of each of a first receiving unit, a second receiving unit, and a third receiving unit. The second input unit 12 is another example of each of the first receiving unit, the second receiving unit, and the third receiving unit. The first input unit 11 and the second input unit 12 are an example of a plurality of receiving units. The first input image information is an example of each of first image information, second image information, and third image information. The second input image information is another example of the first image information, the second image information, and the third image information. The number of input units provided in the projector 1 is not limited to two and may be, for example, one, or three or more.

The operation detection unit 13 is an operation button for setting an operation mode. The operation detection unit 13 may be a physical operation button or an operation button displayed on a touch panel.

The operation detection unit 13 detects a first operation to switch the operation mode from the first mode to the second mode, and a second operation to switch the operation mode from the second mode to the first mode. The first operation is an example of a switching operation. The operation detection unit 13 is an example of a first detection unit.

The trigger detection unit 14 detects a trigger for an event executed in the second mode. The trigger detection unit 14 is an example of a second detection unit. The event executed in the second mode is hereinafter referred to simply as an "event".

The event is each of a first event in which an image corresponding to the first input image information inputted to the first input unit 11 is projected on the projection surface 10 and a second event in which an image corresponding to the second input image information inputted to the second input unit 12 is projected on the projection surface 10.

The trigger for the first event is the reception of the first input information by the trigger detection unit 14. The trigger for the second event is the reception of the second input information by the trigger detection unit 14.

The event executed in the second mode is not limited to the above event and can be changed according to need. The trigger for the event is not limited to the above trigger, either, and can be changed according to need.

The display unit 15 projects an image onto the projection surface 10 and thus displays the image on the projection surface 10. The display unit 15 is an example of an execution unit. The display unit 15 includes a switching unit 151, an image processing unit 152, and a projection unit 153.

The switching unit 151 switches the image information outputted to the image processing unit 152, according to the operation mode. Specifically, the switching unit 151 outputs the first mode image information to the image processing unit 152 when in the first mode, and outputs one of the first input image information and the second input image information to the image processing unit 152 when in the second mode.

The image processing unit 152 is, for example, a computer such as a CPU (central processing unit). The image processing unit 152 may be formed of one or a plurality of processing devices. The image processing unit 152 performs image processing of image information such as the first mode image information, the first input image information, and the second input image information, and thus generates an image signal.

The image processing executed by the image processing unit 152 includes, for example, resolution conversion processing or frame rate conversion processing. In the resolution conversion processing, the image processing unit 152 converts the resolution of the image information into a resolution designated by the processing unit 17, for example, the resolution of a liquid crystal light valve 1533, described later. In the frame rate conversion processing, the image processing unit 152 converts the frame rate of the image information into a frame rate designated by the processing unit 17. The image processing unit 152 may execute both of the resolution conversion processing and the frame rate conversion processing or may execute other image processing, for example, so-called gamma correction processing.

The projection unit 153 projects an image based on the image signal generated by the image processing unit 152 onto the projection surface 10 and thus displays the image on the projection surface 10.

The storage unit 16 is a computer-readable recording medium. The storage unit 16 includes, for example, a flash memory. The storage unit 16 stores various kinds of information and a program executed by the processing unit 17.

The processing unit 17 is, for example, a computer such as a CPU. The processing unit 17 may be formed of one or a plurality of processors. The processing unit 17 reads and executes a program stored in the storage unit 16 and thus implements a mode management unit 171, a display control unit 172, and an operation control unit 173.

The mode management unit 171 manages the first mode and the second mode, as the operation mode. The mode management unit 171 is an example of a management unit.

The display control unit 172 controls the display unit 15 according to the operation mode managed by the mode management unit 171.

The operation control unit 173 controls the mode management unit 171 and the display unit 15. The operation control unit 173 is an example of a control unit.

The operation control unit 173 causes the mode management unit 171 to switch the operation mode from the first mode to the second mode, based on the detection of the first operation by the operation detection unit 13 in the state of the first mode. In this embodiment, when the operation detection unit 13 detects the first operation in the state of the first mode, the operation control unit 173 causes the mode management unit 171 to switch the operation mode from the first mode to the second mode.

The operation control unit 173 causes the mode management unit 171 to switch the operation mode from the second mode to the first mode, based on the detection of the second operation by the operation detection unit 13 in the state of the second mode. In this embodiment, when the operation detection unit 13 detects the second operation in the state of the second mode, the operation control unit 173 causes the mode management unit 171 to switch the operation mode from the second mode to the first mode.

Based on the detection of a trigger for an event by the trigger detection unit 14 in the state of the second mode, the operation control unit 173 causes the display unit 15 to execute the event. In this embodiment, when the trigger detection unit 14 detects a trigger for an event in the state of the second mode, the operation control unit 173 causes the display unit 15 to execute the event.

Based on the detection of a trigger for an event by the trigger detection unit 14 in the state of the first mode, the operation control unit 173 causes the display unit 15 to execute the event after the operation mode is switched from the first mode to the second mode in response to the first operation. In this embodiment, when the trigger detection unit 14 detects a trigger for an event in the state of the first mode, the operation control unit 173 causes the display unit 15 to execute the event after the operation mode is switched from the first mode to the second mode in response to the first operation.

A3: Configuration Example of Projection Unit 153

Figure 3:
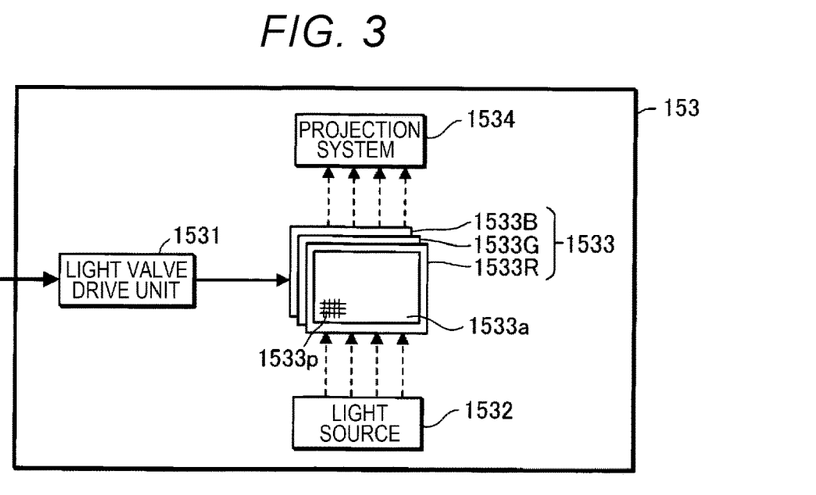
FIG. 3 shows an example of a projection unit 3.

FIG. 3 shows an example of the projection unit 153. The projection unit 153 includes a light valve drive unit 1531, a light source 1532, a liquid crystal light valve for red 1533R, a liquid crystal light valve for green 1533G, a liquid crystal light valve for blue 1533B, and a projection system 1534. Hereinafter, when the liquid crystal light valve for red 1533R, the liquid crystal light valve for green 1533G, and the liquid crystal light valve for blue 1533B need not be discriminated from each other, these are referred to as the "liquid crystal light valve 1533".

The light valve drive unit 1531 drives the liquid crystal light valve 1533, based on the image signal inputted from the image processing unit 152.

The light source 1532 is a xenon lamp, ultra-high-pressure mercury lamp, LED (light-emitting diode), or laser light source or the like. The light emitted from the light source 1532 is reduced in unevenness in the luminance distribution by an optical integration system, not illustrated, and is subsequently separated into color light components of red, green, and blue, which are the primary colors of light, by a color separation system, not illustrated. The red color light component becomes incident on the liquid crystal light valve for red 1533R. The green color light component becomes incident on the liquid crystal light valve for green 1533G. The blue color light component becomes incident on the liquid crystal light valve for blue 1533B.

The liquid crystal light valve 1533 is formed of a liquid crystal panel or the like having a pair of transparent substrates with a liquid crystal arranged between them. The liquid crystal light valve 1533 has a rectangular pixel area 1533a including a plurality of pixels 1533p located into a matrix. In the liquid crystal light valve 1533, a drive voltage is applied to the liquid crystal at each pixel 1533p. When the light valve drive unit 1531 applies a drive voltage based on the image signal to each pixel 1533p, each pixel 1533p is set to a light transmittance based on the drive voltage. Therefore, the light emitted from the light source 1532 is modulated by passing through the pixel area 1533a and thus forms an image based on the image signal, corresponding to each color light.

The images of the respective colors are combined together at each pixel 1533p by a light combining system, not illustrated, and thus form a color image. The color image is projected onto the projection surface 10 by the projection system 1534.

A4: Explanation of Operation

Figure 4:
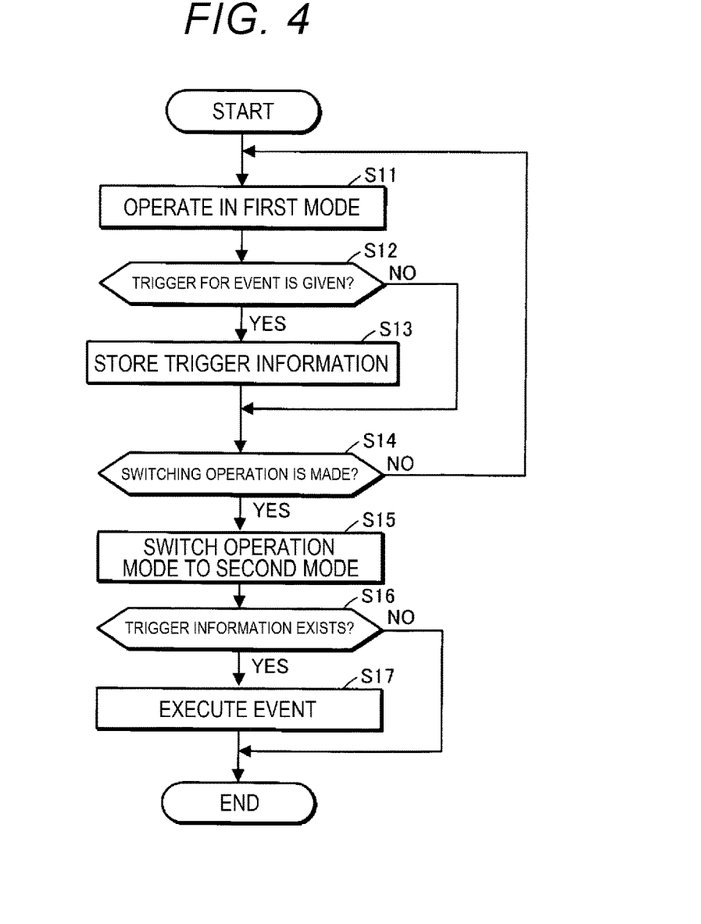
FIG. 4 is a flowchart for explaining an operation of the projector.

FIG. 4 is a flowchart for explaining an operation of the projector 1. Hereinafter, to simplify the description, the operation in the state where the operation mode is the first mode is described.

When the operation mode is the first mode, the display control unit 172 operates in the first mode in step S11.

For example, in step S11, the display control unit 172 causes the storage unit 16 to output the first mode image information to the switching unit 151. Subsequently, the display control unit 172 causes the switching unit 151 to output the first mode image information to the image processing unit 152. Subsequently, the display control unit 172 causes the image processing unit 152 to execute image processing of the first mode image information. The image processing unit 152 performs image processing of the first mode image information and thus generates a first mode image signal based on the first mode image information. Subsequently, the display control unit 172 causes the projection unit 153 to project a first mode image corresponding to the first mode image signal, that is, an image for screen saver, onto the projection surface 10.

Subsequently, as the trigger detection unit 14 detects a trigger for an event in step S12, the operation control unit 173 stores trigger information representing the trigger for the event into the storage unit 16 in step S13.

For example, when the first wiring cable 4 is electrically coupled to the first input unit 11 and the first input unit 11 receives the first input image information in the state where the operation mode is the first mode, the first input unit 11 transmits the first input information to the trigger detection unit 14. The trigger detection unit 14 receives the first input information and thus detects a trigger for a first event. On detecting the trigger for the first event, the trigger detection unit 14 outputs the first input information to the operation control unit 173. On receiving the first input information, the operation control unit 173 stores the first input information as trigger information into the storage unit 16.

Meanwhile, when the second wiring cable 5 is coupled to the second input unit 12 and the second input unit 12 receives the second input image information in the state where the operation mode is the first mode, the second input unit 12 transmits the second input information to the trigger detection unit 14. The trigger detection unit 14 receives the second input information and thus detects a trigger for a second event. On detecting the trigger for the second event, the trigger detection unit 14 outputs the second input information to the operation control unit 173. On receiving the second input information, the operation control unit 173 stores the second input information as trigger information into the storage unit 16.

When newly receiving the first input information or the second input information in the state where trigger information is already stored in the storage unit 16, the operation control unit 173 first deletes the trigger information that is already stored, and subsequently stores the newly received first input information or second input information as trigger information into the storage unit 16.

When the trigger detection unit 14 does not detect a trigger for an event in step S12, step S13 is skipped.

Subsequently, when, in step S14, the operation detection unit 13 does not detect the first operation, specifically, the switching operation, the processing returns to step S11.

Meanwhile, when the operation detection unit 13 detects the switching operation in step S14, the operation control unit 173 in step S15 causes the mode management unit 171 to switch the operation mode from the first mode to the second mode. As the operation mode is switched from the first mode to the second mode, the display control unit 172 causes the switching unit 151 to stop the output of the first mode image information.

Subsequently, the operation control unit 173 in step S16 determines whether trigger information is stored in the storage unit 16 or not.

When trigger information is stored in the storage unit 16, the operation control unit 173 in step S17 causes the display unit 15 to execute the event corresponding to the trigger information.

For example, in step S17, the operation control unit 173 first reads the trigger information stored in the storage unit 16. When the trigger information is the first input information, the operation control unit 173 causes the switching unit 151 to output the first input image information to the image processing unit 152. When the trigger information is the second input information, the operation control unit 173 causes the switching unit 151 to output the second input image information to the image processing unit 152. Subsequently, the operation control unit 173 deletes the trigger information stored in the storage unit 16.

When receiving the first input image information from the switching unit 151, the image processing unit 152 performs image processing of the first input image information and thus generates a first input image signal. Meanwhile, when receiving the second input image information from the switching unit 151, the image processing unit 152 performs image processing of the second input image information and thus generates a second input image signal.

When the image processing unit 152 generates the first input image signal, the projection unit 153 projects an image based on the first input image signal onto the projection surface 10 and thus displays the image on the projection surface 10.

Meanwhile, when the image processing unit 152 generates the second input image signal, the projection unit 153 projects an image based on the second input image signal onto the projection surface 10 and thus displays the image on the projection surface 10.

When trigger information is not stored in the storage unit 16 in step S16, step S17 is skipped.

In the projector 1 and the method for controlling the projector 1 according to this embodiment, when the trigger detection unit 14 detects a trigger for an event in the state where the operation mode is the first mode, the operation control unit 173 causes the display unit 15 to execute the event after the operation mode is switched from the first mode to the second mode in response to the switching operation.

Therefore, an event can be executed in response to a trigger for the event detected in the first mode, while a switching from the first mode to the second mode in response to the detection of the trigger for the event is restrained.

Thus, the first mode can be restrained from being ended by an operation that is different from the switching operation. Also, since the event is executed after the operation mode is switched to the second mode, the time and effort of generating the trigger for the event again can be eliminated.

When in the first mode, the display unit 15 displays the first mode image on the projection surface 10. Therefore, the display of the first mode image can be restrained from being ended by an operation that is different from the switching operation. Thus, opportunities for the viewer to see the display of the first mode image can be increased, compared with a configuration where the display of the first mode image is ended by an operation that is different from the switching operation. Therefore, for example, an image showing an advertisement, or an image decorating a three-dimensional object, is used as the first mode image, the image can be made more recognizable to the user.

For example, in the case where the trigger for the event is the input of the first input image information to the first input unit 11, and the event is the display on the projection surface 10 of an image based on the first input image information, the first mode is maintained even when the first input image information is inputted to the first input unit 11 in the state of the first mode. When the operation mode is subsequently switched from the first mode to the second mode, an image based on the first input image information is automatically displayed on the projection surface 10. Therefore, the trigger for the event, that is, the input of the first input image information to the first input unit 11 in the first mode, can be effectively used instead of being ignored.

B: Modification Examples

In the first embodiment, for example, the following configurations may be employed.

B1: Modification Example 1

The trigger for the event may be the input of a selection operation to select an input unit to which the image information used by the display unit 15 is inputted, from the first input unit 11 and the second input unit 12.

As an example, when the trigger detection unit 14 detects the input of the selection operation, the trigger detection unit 14 outputs selection operation input information representing the input unit selected by the selection operation, to the operation control unit 173.

The operation control unit 173 stores the selection operation input information as trigger information into the storage unit 16 in step S13 shown in FIG. 4.

When the selection operation input information is stored in the storage unit 16, in step S17 shown in FIG. 4, the operation control unit 173 causes the switching unit 151 to output the image information inputted by the input unit represented by the selection operation input information, and subsequently deletes the selection operation input information from the storage unit 16.

According to Modification Example 1, the trigger for the event, that is, the input of the selection operation in the first mode, can be effectively used instead of being ignored.

B2: Modification Example 2

When the trigger detection unit 14 detects a trigger for an event in the first mode, the operation control unit 173 may cause the display unit 15 to display, on the projection surface 10, an inquiry about whether the execution of the event is needed or not after the operation mode is switched from the first mode to the second mode in response to the switching operation.

An example of the inquiry may be "Is it all right to execute an event for which a trigger is detected in the first mode?" However, the inquiry is not limited to the foregoing inquiry and can be changed according to need.

In this case, the operation control unit 173 accepts a response to the inquiry, and causes the display unit 15 to execute the event when the response shows that the execution of the event is needed.

For example, when the operation detection unit 13 has the function of receiving a response to an inquiry, the operation control unit 173 controls the execution of an event by the display unit 15 according to the response received by the operation detection unit 13. Specifically, when the response is positive about the execution of the event, the operation control unit 173 causes the display unit 15 to execute the event. When the response is negative about the execution of the event, the operation control unit 173 does not cause the display unit 15 to execute the event.

According to Modification Example 2, an inquiry is made about whether the execution of an event is needed or not. The event is executed when the response is positive about the execution of the event. Therefore, the execution of an unnecessary event can be avoided.

B3: Modification Example 3

When the operation detection unit 13 detects the switching operation without the trigger detection unit 14 detecting the trigger for the event in the first mode, the operation control unit 173 may cause the mode management unit 171 to switch the operation mode from the first mode to the second mode, and may determine whether the first input unit 11 has received the first input image information or not. When the first input unit 11 has received the first input image information, the operation control unit 173 may cause the display unit 15 to display an image based on the first input image information, on the projection surface 10.

According to Modification Example 3, when the operation mode is switched from the first mode to the second mode without the trigger for the event being detected in the first mode, an image based on the first input image information can be automatically displayed on the projection surface 10. In Modification Example 3, the second input unit 12 may be used instead of the first input unit 11.

B4: Modification Example 4

When the operation detection unit 13 detects the switching operation without the trigger detection unit 14 detecting the trigger for the event in the first mode, the operation control unit 173 may cause the mode management unit 171 to switch the operation mode from the first mode to the second mode, and may notify the first PC 2 electrically coupled to the first input unit 11, of an instruction to turn the power on. The first PC 2 is an example of an external device.

For example, when the first wiring cable 4 is an HDMI cable, the operation control unit 173 notifies the first PC 2 of an instruction to turn the power on, using an HDMI link function.

According to Modification Example 4, when the operation mode is switched from the first mode to the second mode without the trigger for the event being detected in the first mode, the power of the first PC 2 electrically coupled to the first input unit 11 can be automatically turned on.

B5: Modification Example 5

The trigger for the event may be generated at a preset timing.

For example, when a schedule to execute the display of an image based on the first input image information in the second mode at 4:00 pm is set in the projector 1, and the processing unit 17 generates an execution start instruction for this schedule at 4:00 pm according to the schedule, the trigger detection unit 14 detects the execution start instruction for the schedule generated at 4:00 pm, as the trigger for the event.

According to Modification Example 5, an event for which the start timing has come in the state where the operation mode is the first mode can be automatically executed with the switching of the operation mode from the first mode to the second mode.

B6: Modification Example 6

Although the liquid crystal light valve 1533 is used as an example of the light modulation device, the light modulation device is not limited to the liquid crystal light valve and can be changed according to need. For example, the light modulation device may have a configuration using three reflection-type liquid crystal panels. The light modulation device may also have such a configuration as a system using one liquid crystal panel, a system using three digital mirror devices (DMDs), or a system using one digital mirror device. When only one liquid crystal panel or DMD is used as the light modulation device, components equivalent to the color separation system and the light combining system are not needed. Other than the liquid crystal panel and the DMD, any configuration that can modulate the light emitted from the light source 1532 can be employed as the light modulation device.

B7: Modification Example 7

The display device is not limited to the projector 1 and may be a direct-view display such as a liquid crystal display.

B8: Modification Example 8

All or a part of the elements implemented by the processing unit 17 executing a program may be implemented by hardware including an electronic circuit, for example, an FPGA (field-programmable gate array) or ASIC (application-specific IC). Also, the image processing unit 152 may be implemented by an electronic circuit such as an FPGA or ASIC.

What is claimed is:

1. A method for controlling a display device having, as an operation mode, a first mode and a second mode different from the first mode, the method comprising:
   detecting, in the first mode, a trigger for an event executed in the second mode;
   storing trigger information representing the trigger for the event;
   switching the operation mode from the first mode to the second mode, based on a switching operation to switch the operation mode from the first mode to the second mode; and
   executing the event after the operation mode is switched from the first mode to the second mode in accordance with the trigger information,
   wherein the switching operation is independent of the trigger for the event.

2. The method for controlling the display device according to claim 1, wherein
   in the first mode, an image designated in advance is displayed on a display surface.

3. The method for controlling the display device according to claim 2, wherein
   in the second mode, an image based on image information designated by a user is displayed on the display surface.

4. The method for controlling the display device according to claim 2, wherein
   the trigger for the event is an input of first image information to a first receiving unit, and
   the event includes displaying an image based on the first image information on the display surface.

5. The method for controlling the display device according to claim 2, wherein
   the trigger for the event is a selection of a second receiving unit from a plurality of receiving units, and
   the event includes displaying an image based on second image information received by the second receiving unit on the display surface.

6. The method for controlling the display device according to claim 2, further comprising
   displaying an inquiry on the display surface about whether execution of the event is needed or not after the operation mode is switched from the first mode to the second mode in response to the switching operation, when the trigger is detected in the first mode, and
   executing the event when a response to the inquiry shows that the execution of the event is needed.

7. The method for controlling the display device according to claim 2, further comprising:
   switching the operation mode from the first mode to the second mode and determining whether third image information is received by a third receiving unit or not, when the switching operation is detected without the trigger being detected in the first mode; and
   displaying an image based on the third image information on the display surface, when the third image information is received by the third receiving unit.

8. The method for controlling the display device according to claim 4, further comprising
   switching the operation mode from the first mode to the second mode and notifying an external device electrically coupled to the first receiving unit, of an instruction to turn a power on, when the switching operation is detected without the trigger being detected in the first mode.

9. The method for controlling the display device according to claim 1, wherein
   the trigger for the event is generated at a preset timing.

10. A display device comprising:
    a management unit managing, as an operation mode, a first mode and a second mode different from the first mode;
    a first detection unit detecting a switching operation to switch the operation mode from the first mode to the second mode;
    a second detection unit detecting a trigger for an event executed in the second mode;
    an execution unit executing the event; and
    a control unit controlling the management unit and the execution unit,
    wherein the control unit
      stores trigger information representing the trigger for the event,
      causes the management unit to switch the operation mode from the first mode to the second mode, based on the detection of the switching operation by the first detection unit in the first mode, and
      causes the execution unit to execute the event after the operation mode is switched from the first mode to the second mode in accordance with the trigger information in response to the switching operation, based on the detection of the trigger by the second detection unit in the first mode, and
    wherein the switching operation is independent of the trigger for the event.

11. The display device according to claim 10, wherein
    the execution unit is a display unit, and
    the display unit, in the first mode, displays an image designated in advance on a display surface.

12. The display device according to claim 11, wherein
    the display unit, in the second mode, displays an image based on image information designated by a user on the display surface.

13. The display device according to claim 11, further comprising
    a first receiving unit receiving first image information, wherein
    the trigger for the event is an input of the first image information to the first receiving unit, and
    the event includes displaying an image based on the first image information on the display surface.

14. The display device according to claim 11, further comprising
   a plurality of receiving units to which a second receiving unit receiving second image information belongs, wherein
   the trigger for the event is a selection of the second receiving unit from the plurality of receiving units, and
   the event includes displaying an image based on the second image information on the display surface.

15. The display device according to claim 11, wherein the control unit
   causes the display unit to display an inquiry on the display surface about whether execution of the event is needed or not after the operation mode is switched from the first mode to the second mode in response to the switching operation, when the second detection unit detects the trigger in the first mode, and
   causes the display unit to execute the event when a response to the inquiry shows that the execution of the event is needed.

16. The display device according to claim 11, further comprising
   a third receiving unit receiving third image information, wherein
   the control unit
   causes the management unit to switch the operation mode from the first mode to the second mode and determines whether the third image information is received by the third receiving unit or not, when the first detection unit detects the switching operation without the second detection unit detecting the trigger in the first mode, and
   causes the display unit to display an image based on the third image information on the display surface, when the third image information is received by the third receiving unit.

17. The display device according to claim 13, wherein the control unit
   causes the management unit to switch the operation mode from the first mode to the second mode and notifies an external device electrically coupled to the first receiving unit, of an instruction to turn a power on, when the first detection unit detects the switching operation without the second detection unit detecting the trigger in the first mode.

18. The display device according to claim 10, wherein the trigger for the event is generated at a preset timing.

19. The method for controlling the display device according to claim 1, wherein
   the trigger for the event includes receipt of input image information to be displayed in the second mode after the operation switches from the first mode to the second mode.

20. The method for controlling the display device according to claim 1, wherein
   the executing of the event is performed after the operation mode is switched from the first mode to the second mode and the trigger for the event is executed, and the executing of the event is not performed after the operation mode is switched from the first mode to the second mode if the trigger for the event is not executed.

* * * * *